E. MURRAY.

SPRING VEHICLE WHEEL.

APPLICATION FILED NOV. 6, 1911.

Reissued Jan. 16, 1912. 13,364.

WITNESSES

Daniel Webster, Jr.

Thurnd

INVENTOR

Esther Murray

BY Francis T. Chambers

Her ATTORNEY

UNITED STATES PATENT OFFICE.

ESTHER MURRAY, OF LONDON, ENGLAND, ASSIGNOR TO THE RESILIENT MOTOR WHEEL SYNDICATE LIMITED, OF LONDON, ENGLAND, A LIMITED COMPANY OF GREAT BRITAIN.

SPRING VEHICLE-WHEEL.

13,364. Specification of Reissued Letters Patent. Reissued Jan. 16, 1912.

Original No. 939,432, dated November 9, 1909, Serial No. 418,159. Application for reissue filed November 6, 1911. Serial No. 658,883.

*To all whom it may concern:*

Be it known that I, ESTHER MURRAY, now a resident of London, in England, but lately residing at Glasgow, in the county of Lanark, Scotland, have invented a certain new and useful Improvement in Spring Vehicle-Wheels, of which the following is a specification.

This invention which relates to the road wheels of cycles, motors and other vehicles, of the type in which the resiliency of the wheel depends principally or entirely upon the interposition of a spring or springs between the hub or inner rim, and the rim carrying the tire or tread, has for its object the provision of a spring of such form that the greatest resiliency is imparted to the wheel while the necessary rigidity or driving power in the direction of drive is maintained when traveling to the rear as well as when traveling forward.

Figure 2:
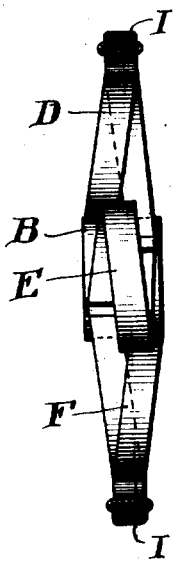
Figure 1:
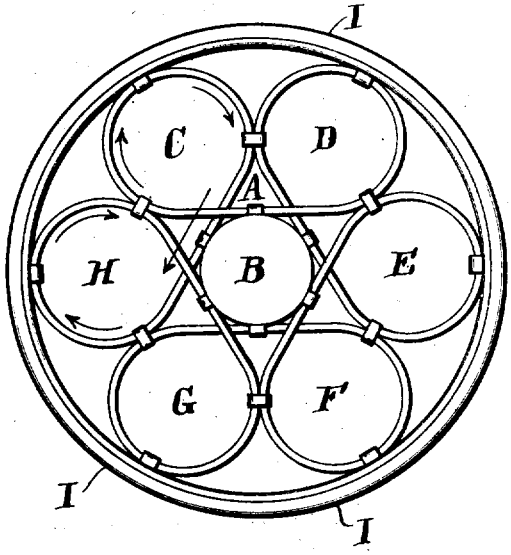

In order that my invention may be properly understood and readily carried into effect I have hereunto appended one sheet of drawings, of which, Figure 1 is a side elevation of a vehicle wheel made in accordance with and embodying my invention. Fig. 2 is an end elevation of the same with the tire and rim in section.

In building up a wheel containing my improvements, I employ a continuous strip of hard flexible metal such as steel of convenient breadth, and bent to form a series of loops of circular form and intervening loop connecting portions, the latter being secured to the hub B of the wheel, and the tops or outer sides of the loops being secured to the rim I of the wheel. As shown in the drawings there are six of these loops, C, D, E, F, G and H, although a less or greater number could be employed. The loops are arranged zigzag, *i. e.* they are alternately right and left hand spirals, and the intervening loop connecting portions are arranged in two series, one beside the other, so that each of said intervening portions, as shown clearly in the drawings, crosses two other of said portions adjacent the hub. In this form of wheel the loops or the crossing portions of the strip are arranged out of alinement.

Having now described my invention what I claim as new and desire to secure by Letters Patent is,

1. In a spring vehicle wheel, the combination with a hub and a rim, of a continuous one-piece strip of yielding material supportingly interposed between the hub and the rim, said strip being bent to form a plurality of circular loops arranged in abutting relation with respect to each other and with respect to the rim and out of engagement with the hub, means connecting said loops with each other at engaging points thereof and means connecting said loops with said rim at engaging points of the loops therewith, said strip being provided with a plurality of straight sections connecting adjacent loops and lying tangentially against the hub with the straight sections crossing each other, and means connecting said straight connections with the hub at the point of engagement therewith.

2. In a spring vehicle wheel, the combination with a hub and a rim, of a continuous one-piece strip of yielding material supportingly interposed between the hub and the rim, said strip being bent to form a plurality of circular loops, means connecting said loops with each other, and means connecting said loops with said rim, said strip being provided with straight sections connecting adjacent loops, and means connecting said straight sections with said hub.

3. In a spring vehicle wheel, the combination with the hub and a rim, of a continuous one-piece strip of yielding material bent to form a plurality of straight portions lying tangentially against said hub and each crossing two others of said portions and spiral loop portions connecting said straight portions, each of said loop portions being substantially circular in shape and serving to connect one end of one of said straight portions to the adjacent end of one of the other straight portions crossing it, means connecting said straight portions to the hub, and means connecting said loop portions to the rim.

4. In a spring vehicle wheel, the combination with a hub and a rim, of a continuous strip of yielding material supportingly interposed between the hub and the rim, said strip being bent to form a series of alternate right and left hand spiral loop portions arranged at intervals around the hub and each extending into proximity with the rim, and intervening loop connecting portions which lie next the hub and are alternately arranged in two series, one beside the other, means connecting the outer sides of the loops to the rim, and means for clamping the loop connecting portions to the hub.

ESTHER MURRAY.

Witnesses:
SYDNEY E. PAGE,
HERBERT D. JAMESON.